United States Patent [19]

Cheruvu et al.

[11] Patent Number: 5,608,019

[45] Date of Patent: Mar. 4, 1997

[54] TEMPERATURE CONTROL OF MW IN OLEFIN POLYMERIZATION USING SUPPORTED METALLOCENE CATALYST

[75] Inventors: Subrahmanyam Cheruvu, Robbinsville; Frederick Y. Lo, Edison, both of N.J.

[73] Assignee: Mobil Oil Corporation, Fairfax, Va.

[21] Appl. No.: 148,309

[22] Filed: Nov. 8, 1993

Related U.S. Application Data

[63] Continuation-in-part of Ser. No. 997,421, Dec. 28, 1992, Pat. No. 5,332,706, and Ser. No. 36,796, Mar. 25, 1993, Pat. No. 5,420,220.

[51] Int. Cl.$^6$ .............................. C08F 4/642; C08F 2/34
[52] U.S. Cl. .................... 526/129; 526/127; 526/156; 526/160; 526/165; 526/901; 526/905; 526/348.5
[58] Field of Search ...................... 526/348.1, 127, 526/129, 156, 160, 901, 943, 165

[56] References Cited

U.S. PATENT DOCUMENTS

| | | | |
|---|---|---|---|
| 3,950,269 | 5/1976 | Setterquist | 252/430 |
| 4,057,475 | 11/1977 | Canich et al. | 502/104 |
| 4,188,470 | 2/1980 | Collina et al. | 526/64 |
| 4,299,936 | 11/1981 | Candlin et al. | 526/119 |
| 4,324,691 | 4/1982 | Hartshorn | 252/429 |
| 4,530,914 | 7/1985 | Ewen et al. | 502/113 |
| 4,536,484 | 8/1985 | Lacombe et al. | 502/62 |
| 4,658,078 | 4/1987 | Slaugh et al. | 585/512 |
| 4,665,047 | 5/1987 | Slaugh et al. | 502/108 |
| 4,710,552 | 12/1987 | Bachl et al. | 526/116 |
| 4,752,597 | 6/1988 | Turner | 502/104 |
| 4,769,510 | 9/1988 | Kaminsky et al. | 585/512 |
| 4,794,096 | 12/1988 | Ewen | 502/117 |
| 4,814,540 | 3/1989 | Watanabe et al. | 585/523 |
| 4,871,704 | 10/1989 | Kohara et al. | 502/114 |
| 4,912,075 | 3/1990 | Chang | 502/107 |
| 4,914,253 | 4/1990 | Chang | 585/523 |
| 4,923,833 | 5/1990 | Kioka et al. | 502/9 |
| 4,925,821 | 5/1990 | Chang | 502/107 |
| 4,931,517 | 6/1990 | Fujita | 526/128 |
| 4,933,403 | 6/1990 | Kaminsky et al. | 526/160 |
| 4,935,397 | 6/1990 | Chang | 502/117 |
| 4,937,217 | 6/1990 | Chang | 502/111 |
| 4,937,301 | 6/1990 | Chang | 526/128 |
| 4,962,248 | 10/1990 | Winter et al. | 585/12 |
| 4,962,262 | 10/1990 | Winter et al. | 585/512 |
| 5,001,205 | 3/1991 | Hoel | 526/128 |
| 5,006,500 | 4/1991 | Chang | 502/107 |
| 5,008,228 | 4/1991 | Chang | 502/111 |
| 5,023,388 | 6/1991 | Luker | 585/9 |
| 5,026,797 | 6/1991 | Takahashi | 526/124 |
| 5,043,515 | 8/1991 | Slaugh et al. | 585/512 |
| 5,055,438 | 10/1991 | Canich | 502/117 |
| 5,066,631 | 11/1991 | Sangokoya et al. | 502/152 |
| 5,086,024 | 2/1992 | Crapo et al. | 502/117 |
| 5,086,135 | 2/1992 | Kissin | 526/151 |
| 5,087,788 | 2/1992 | Wu | 585/512 |
| 5,091,352 | 2/1992 | Kioka et al. | 502/103 |
| 5,126,303 | 6/1992 | Resconi et al. | 502/117 |
| 5,132,262 | 7/1992 | Rieger et al. | 502/117 |
| 5,132,381 | 7/1992 | Winter et al. | 526/160 |
| 5,145,819 | 9/1992 | Winter et al. | 502/117 |
| 5,147,949 | 9/1992 | Chang | 526/129 |
| 5,157,008 | 10/1992 | Sangokoya | 502/111 |
| 5,171,799 | 12/1992 | Kioka et al. | 26/127 |
| 5,171,871 | 12/1992 | Miyashita | 556/27 |
| 5,171,919 | 12/1992 | Watanabe et al. | 585/523 |
| 5,196,496 | 3/1993 | Galimberti et al. | 526/348 |
| 5,198,399 | 3/1993 | Hoff et al. | 502/111 |
| 5,206,197 | 4/1993 | Campbell, Jr. | 502/103 |
| 5,206,199 | 4/1993 | Kioka et al. | 502/117 |
| 5,208,304 | 5/1993 | Waymouth | 526/164 |
| 5,216,095 | 6/1993 | Dolle et al. | 526/127 |
| 5,223,465 | 6/1993 | Ueli et al. | 502/117 |
| 5,225,500 | 7/1993 | Elder et al. | 526/127 |
| 5,234,878 | 8/1993 | Tsutsui et al. | 502/103 |
| 5,238,891 | 8/1993 | Miro | 502/104 |
| 5,238,892 | 8/1993 | Chang | 502/111 |
| 5,240,894 | 8/1993 | Burkhardt et al. | 502/108 |
| 5,241,025 | 8/1993 | Hlatky et al. | 526/129 |
| 5,242,876 | 9/1993 | Shamshoum et al. | 502/113 |
| 5,332,706 | 7/1994 | Nowlin et al. | 502/107 |
| 5,405,922 | 4/1995 | DeChellis et al. | 526/68 |
| 5,422,325 | 6/1995 | Jejelowo et al. | 502/104 |
| 5,441,920 | 8/1995 | Welborn | 502/103 |
| 5,442,019 | 8/1995 | Agapiou et al. | 526/82 |
| 5,462,999 | 10/1995 | Griffin et al. | 526/68 |
| 5,466,649 | 11/1995 | Jejelowo | 502/120 |
| 5,468,702 | 11/1995 | Jejelowo | 502/104 |
| 5,470,811 | 11/1995 | Jejelowo | 502/117 |

FOREIGN PATENT DOCUMENTS

| | | |
|---|---|---|
| 0515132 | 11/1992 | European Pat. Off. . |
| 0516458 | 12/1992 | European Pat. Off. . |

OTHER PUBLICATIONS

Kaminsky, W., et al., "Elastomers by Atactic Linkage of α-olefins Using Soluble Ziegler Catalysts", Makromol. Chem., Makromol. Symp, 4, 1986, pp. 103–118.

Chien, James C. W., et al., "Metallocene-Methylaluminoxane Catalysts for Olefin Polymerization. I. Trimethylaluminum as Coactivator", Journal of Polymer Science, vol. 26, 1988, pp. 3089–3102.

Kaminsky, W., "Synthesis of Polyolefins With Homogeneous Ziegler–Natta–Catalysts of High Activity", History of Polyolefins, 1986, pp. 257–270.

Sinn, H. et al., "Scope of Ziegler Catalysis", Advances in Organometallic Chemistry, vol. 18, 1980, pp. 99–149.

Furtek, A. B., "Ultra Strength Polyethylene Resins Produced In A Fluid–Bed Process Utilizing Metallocene–Based Catalysts", Caralyst, Inc., 125–137, May 1993.

Kaminsky, W. Dr., "Metallocene Catalysts", Global Business Chamges, Monomers, Polymers, Markets and Applications, III–3.1—III–3.21, Dec. 1992.

Primary Examiner—Fred Teskin
Attorney, Agent, or Firm—Ronald A. Bleeker; Dennis P. Santini; Marina V. Schneller

[57] ABSTRACT

In gas phase polymerizations and copolymerizations of ethylene, temperature controls the molecular weight, expressed as MI (wherein MI is measured according to ASTM D-1238 Condition E), of the resin product. Increase in polymerization temperature produces decrease in MI; whereas, decrease in polymerization temperature produces increase in MI.

30 Claims, No Drawings

TEMPERATURE CONTROL OF MW IN OLEFIN POLYMERIZATION USING SUPPORTED METALLOCENE CATALYST

CROSS REFERENCE TO RELATED APPLICATION

This is a continuation in part of commonly assigned application Ser. No. 07/997421, filed Dec. 28, 1992, now U.S. Pat. No. 5,332,706, and of Ser. No. 08/036,796, filed Mar. 25, 1993, now U.S. Pat. No. 5,420,220, each of which is relied upon and incorporated by reference herein.

FIELD OF THE INVENTION

The invention relates to improvements in polymerization and copolymerization of ethylene, undertaken in the presence of catalysts comprising metallocenes of transition metals. The invention relates to the control of the molecular weight of the product in polymerization and copolymerizations of ethylene and alpha olefins, catalyzed by metallocenes. Furthermore, the invention relates to maintaining the continuous polymerization and copolymerization of ethylene. In specific embodiments, the catalytic process of the invention eliminates reactor fouling with continuous operation of the distributor plate in the fluid bed gas phase reactor undertaken in the presence of catalysts comprising metallocenes of transition metals.

BACKGROUND OF THE INVENTION

Polyethylene is produced commercially in a gas phase reaction in the absence of solvents by employing selected chromium and titanium-containing catalysts under specific operating conditions in a fluid bed process. Polyethylene products of those original processes exhibited medium-to-broad molecular weight distribution. To be commercially useful in the gas phase fluid bed process, or a slurry reactor process, undertaken at low pressures, e.g. of less than about 1000 psi, the catalyst must exhibit high activity, with concomitant high catalyst productivity, because these process systems do not include catalyst residue removal procedures. Accordingly, catalyst residue in the polymer product must be so small that it can be left in the polymer without causing any undue problems in the fabrication and/or to the ultimate consumer. To this end, the patent literature is replete with developments of new catalysts.

The use of metallocene compounds of transition metals as catalysts for polymerization and copolymerization of ethylene is one of those developments. Metallocenes can be described by the empirical formula $Cp_mMA_nB_p$. These compounds in combination with alumoxane have been used to produce olefin polymers and copolymers, such as ethylene and propylene homopolymers, ethylene-butene and ethylene-hexene copolymers, e.g., Kaminsky et al, U.S. Pat. No. 4,542,199 and Sinn et al, U.S. Pat. No. 4,404,344.

Methylalumoxane (MAO) is used as co-catalyst with metallocene catalysts. It belongs to the class of alumoxanes which comprises oligomeric linear and/or cyclic alkylalumoxanes represented by the formula:

R-(Al(R)-O)$_n$-AlR$_2$ for oligomeric, linear alumoxanes and (-Al(R)-O-)$_m$ for oligomeric cyclic alumoxane wherein n is 1–40, preferably 10–20, m is 3–40, preferably 3–20 and R is a $C_1$–$C_8$ alkyl group and preferably methyl. Methylalumoxane is commonly produced by reacting trimethylaluminum with water or with hydrated inorganic salts, such as $CuSO_4 5H_2O$ or $Al_2(SO_4)_3 \cdot 5H_2O$. Methylalumoxane can be also generated in situ in polymerization reactors by adding to them trimethylaluminum and water or water-containing inorganic salts. MAO is a mixture of oligomers with a very wide distribution of molecular weights and usually with an average molecular weight of about 1200. MAO is typically kept in solution in toluene. While the MAO solutions remain liquid at fluid bed reactor temperatures, the MAO itself is a solid at room temperature.

Most of the experiments reported in the literature relating to methylalumoxane used as a cocatalyst with metallocene catalysts are undertaken in a slurry or solution process, rather than in a gas phase fluid bed reactor process.

SUMMARY OF THE INVENTION

The invention relates to high productivity, low pressure (less than 1000 psi) gas phase processes, in which molecular weight control of olefin polymers (or copolymers), produced in the presence of a metallocene catalyst, is effected by controlling the MI of the resulting polymer, in completely unexpected processes. MI is $I_2$, as measured by ASTM D-1238, Condition E- measured at 190 degrees C.—reported as grams per 10 minutes. In preferred embodiments, the process is undertaken in a low pressure fluid bed process for catalytic polymerization or copolymerization of ethylene, in the presence of metallocene catalysts.

In accordance with the invention, polymerizations (or copolymerizations) catalyzed by metallocene catalysts are undertaken by increasing polymerization temperatures to decrease MI of the product. Moreover, the invention relates to decreasing polymerization temperature to increase MI of the product.

Moreover, in accordance with the invention, polymerizations (or copolymerizations) catalyzed by metallocene catalysts are undertaken to include introducing to the polymerization or copolymerization reactor a reagent(s) which decreases MI. The same reagent(s) are reported in the literature to increase the HLMI of polymerization products produced in the presence of chromium containing catalysts. The reagents which are used to decrease MI are electron donating in effect. A preferred group of reagents include oxygen and organic compounds containing oxygen atoms.

In accordance with the invention, polymerizations (or copolymerizations) catalyzed by metallocene catalysts are undertaken to include introducing to the polymerization (or copolymerization) reactor a reagent(s) which increases MI. The reagents which are used to increase MI are electron withdrawing in effect.

DETAILED DESCRIPTION OF THE INVENTION

The invention relates to controlling the molecular weight as reflected by the numerical value MI of olefin polymers and copolymers produced in catalytic processes in which the catalyst comprises a metallocene.

The reason to control molecular weight is to provide a method of meeting target molecular weights which vary for different applications. Generally, a low MI product is used for producing tough films. However, depending on the fabrication means and method, polyethylene (and its copolymers) of different MI will be required. For example for blown film production, the polyethylene target MI ranges from 0.6 to about 2. By comparison, for cast film production the polyethylene target MI ranges from 2.5 to 3.5. When the application is injection molding, and target MI ranges up to 150, usually from 10 to 120, hydrogen may be used to control MI. In embodiments herein, control of the product MI is particularly directed to resins having MI in the range of 0.02 to 20.0, and particularly, in the range of MI is 0.05 to about 10, and more particularly in the range of about 0.05 to about 5.

For decreasing the MI of products produced under the polymerization conditions described below, in accordance with one embodiment, the temperature of polymerization is increased. Thus, if the product MI would be about 10 and the need for decreasing the product MI is present, then the polymerization is undertaken at temperatures at the high end of the range of 55° to about 115° C. The temperature range of the process is dependent on the product density. For example, 60° to 90° C. is typical for low density (<0.930) products. For increasing the MI of products produced under the polymerization conditions described below, in accordance with one embodiment, the temperature of polymerization is decreased. Thus, if the product MI would be about 0.2 and the need for increasing the product MI above 0.2 is present, then the polymerization is undertaken at temperatures at the low end of the range of 60 to about 90. The effect of temperature noted above is independent of the embodiments discussed below where reagents are employed to control MI of resin product.

Thus, in a process where the polymerization of ethylene or its copolymerization with alpha olefins at temperatures ranging from 50 to 100 degrees C or 60 to 100 degrees C., to produce product having a MI (g/10 min.) value in the range of 0.05 to 10, the invention comprises contacting ethylene with a metallocene (of a transition metal) catalyst, at a temperature which exceeds about 65 to produce a product having MI of less than 4, less than 3, and less than about 2; preferably the temperature, which exceeds 65 degrees C, exceeds about 70 degrees C and can exceed about 75 degrees C. to produce a product having MI of less than about 4, or less than 3, and less than about 2. Thus, in a process where the polymerization of ethylene or its copolymerization with alpha olefins at temperatures ranging from 50 to 100 degrees C or 60 to 100 degrees C., to produce product having a MI (g/10 min.) value in the range of 0.05 to 10 and density less than 0.930 g/cc, the invention comprises contacting ethylene with a metallocene (of a transition metal) catalyst, at a temperature which is less than 100 degrees C. to produce a product having MI of greater than about 0.5, e.g., greater than about 1, and/or greater than about 2; the temperature, which is less than about 100 degrees C., can be less than about 90 degrees C and/or less than about 80 or less than 85 degrees C. to produce a product having MI of greater than about 0.5, e.g., greater than about 1, and/or greater than about 2.

Moreover, in another embodiment in accordance with the invention, polymerizations (or copolymerizations) catalyzed by metallocene catalysts are undertaken to include introducing to the polymerization or copolymerization reactor a reagent(s) which decreases MI. The same reagent(s) are reported in the literature to increase the HLMI of polymerization products produced in the presence of chromium containing catalysts. The reagents which are used to decrease MI are electron donating in effect. A preferred group of reagents include oxygen and organic compounds containing oxygen atoms.

In accordance with yet another embodiment of the invention, polymerizations (or copolymerizations) catalyzed by metallocene catalysts are undertaken to include introducing to the polymerization (or copolymerization) reactor a reagent(s) which increases MI. The reagents which are used to increase MI are electron withdrawing in effect.

Conditions for the polymerization and copolymerization of ethylene

The catalyst is a metallocene catalyst, in which the metallocene is a metallocene of a transition metal. Preferably, the metallocene catalyst is a supported catalyst. The catalyst support or carrier can be silica, alumina or silica/alumina; in preferred catalysts described below, the support is silica. The catalyst comprises said support, a transition metal and aluminum, wherein the amount of transition metal (elemental basis) ranges from 0,001 to 10 weight percent and the amount aluminum (elemental basis) ranges from 1 to 40 weight percent. wherein the Al:Zr ratio (elemental basis) ranges from 25 to 10000.

In embodiments herein undertaken in a fluid bed gas phase process, the activated catalyst is fluidized by diffusing gas, e.g., recycle gas, through the bed at a rate sufficient to maintain fluidization. Fluidization is achieved by a high rate of gas recycle to and through the bed, typically in the order of about 200 times the rate of feed of make-up gas.

The olefin feed to the reaction zone of the polymerization reactor comprises ethylene. Ethylene polymers, as well as copolymers of ethylene with one or more $C_3$–$C_{10}$ alpha-olefins, can be produced in accordance with the invention. Thus, copolymers having two monomeric units are possible as well as terpolymers having three monomeric units. Particular examples of such polymers include ethylene/1-butene copolymers, ethylene/1-hexene copolymers and ethylene/4-methyl-l-pentene copolymers. Ethylene/1-butene and ethylene/1-hexene copolymers are the most preferred copolymers polymerized in the process of and with the catalyst of this invention. The ethylene copolymers produced in accordance with the present invention preferably contain at least about 80 percent by weight of ethylene units. The catalyst of this invention may be used to polymerize propylene and other alpha-olefins and to copolymerize them. Preferably, the polymerization (copolymerization) is undertaken at a temperature and/or pressure below the sintering temperature of the polymer particles.

In polymerizations described herein, pressures are below 10000 psi, preferably below 1000psi. In low pressure polymerizations, pressures of up to about 1000 psi are employed. In low pressure polymerizations of the embodiments herein, pressures are below 400 psi and preferably operation is at a pressure of from about 150 to 350 psi. The high activity of the catalysts herein allow for efficacious low pressure fluid bed gas phase polymerizations. Much lower activity catalysts than those described herein may be employed in high pressure processes at pressures which exceed 400 psi, such as solution and high pressure slurry polymerizations. In accordance with the embodiments of the invention, the fluid bed reactor is operated at pressures of up to about 1000 psi. In low pressure polymerizations of the embodiments herein, pressures are below 400 psi and preferably in the range of from about 150 to 350 psi, with operation at the higher pressures in such ranges favoring heat transfer since an increase in pressure increases the unit volume heat capacity of the gas. In preferred embodiments reported below, the process is undertaken in the fluid bed gas phase.

For the production of ethylene copolymers in the process of the present invention an operating temperature of about 30° to 115° C. is preferred. Generally, guideline temperatures include temperatures of about 60° to 90° C. to prepare products having a density of about 0.91 to 0.92 g/cc; temperatures of about 70° to 100° C. to prepare products having a density of about 0.92 to 0.94 g/cc, and temperatures of about 80° to 115° C. to prepare products having a density of about 0.94 to 0.96 g/cc.

The partially or completely activated catalyst is injected into the fluid bed at a point above the distribution plate at a rate equal to its consumption. Since the catalysts used in the practice of this invention are highly active, injection of the fully activated catalyst into the area below the distribution plate may cause polymerization to begin there and eventually cause plugging of the distribution plate. Injection into the bed, instead, aids in distributing the catalyst throughout the bed and precludes the formation of localized spots of high catalyst concentration.

The production rate of polymer in the bed is controlled by the steady state rate of catalyst and monomer injection. Since any change in the rate of catalyst injection changes the rate of generation of the heat of reaction, the temperature of the recycle gas is adjusted to accommodate the change in rate of heat generation. Complete instrumentation of both the fluidized bed and the recycle gas cooling system is, of course, necessary to detect any temperature change in the bed so as to enable the control system to make a suitable adjustment in the temperature of the recycle gas. Since the rate of heat generation is directly related to product formation, a measurement of the temperature rise of the gas across the reactor (the difference between inlet gas temperature and exit gas temperature) is determinative of the rate of particulate polymer formation at a constant gas velocity. The reagents which are used to decrease MI, compared to the MI of products produced in the absence of said reagents, are isopentane and compounds which are electron donating in effect.

Electron donating compounds which have been used and which do decrease MI include oxygen, carbon dioxide, carbon monoxide. A preferred group of reagent compounds which are electron donating in effect include organic compounds which include oxygen atoms. Electron donating reagents which may be used include CO, $CO_2$, NO, $NO_2$, $N_2O$ ethers, alcohol, peroxides, ketones, esters, thioethers, amines, phosphines, phosphine oxides, and phenols.

The general formula for these electron donating reagents are: ROR1, ROH, ROOR1, RCOR1, RCOOR1, RSR1, RR1R2N, RR1R2P, RR1R2PO where R is $CH_3$, $C_2H_5$, n-$C_3H_7$, i-$C_3H_7$, n-$C_4H_9$, i-$C_4H_9$, t-$C_4H_9$, $C_6H_5$ or other alkyl substituted aryl group;

R1=R2=H, $CH_3$, $C_2H_5$, n-$C_3H_7$, i-$C_3H_7$, n-$C_4H_9$, i-$C_4H_9$, t-$C_4H_9$, $C_6H_5$ or other alkyl substituted aryl group.

These reagents are added in amounts effective to change the MI of the product by decreasing it. In a gas phase, fluid bed reactor the olefin feed is in the presence of about 0.01 to about 1000 ppm molar ratio of these compounds, calculated on the basis of ethylene feed. This compound can be injected into the reaction (polymerization zone) or added as a cofeed, or admixed with recycle gas, or fed into any other feedstream.

Reagents including those containing electron withdrawing atoms have also been employed to control MI by increasing MI and include trialkylaluminum, e.g., trimethylaluminum, triethylaluminum, triisobutylaluminum, alkylaluminum chloride, trialkyl borane, and dialkylmagnesium compounds containing electron withdrawing groups tend to increase MI. Some representative, but not limited to, formula are: $R_2Mg$, $RMgCl$, $R_3Al$, $R_3B$, $R_2AlCl$, $R_2BCl$, $RAlCl_2$, $RBCl_2$, $R_3Al_2Cl_3$, $R_3B_2Cl_3$ where R=$H_1$, $CH_3$, $C_2H_5$, n-$C_3H_7$, i-$C_3H_7$, n-$C_4H_9$, i-$C_4H_9$, t-$C_4H_9$, $C_6H_5$ or other alkyl group, or aryl group, or substituted aryl group. These reagents are added in amounts effective to change the MI of the product by increasing it. In a gas phase, fluid bed reactor, the olefin feed is in the presence of about 10 to about 1000 ppm molar ratio of these compounds, calculated on the basis of ethylene feed. In addition to increasing MI the reagent does not increase fines production. This compound can be injected into the reaction (polymerization zone) or added as a cofeed, or admixed with recycle gas, or injected with a comonomer.

Hydrogen may be used as a chain transfer agent in the polymerization reaction of the present invention. The ratio of hydrogen/ethylene employed will vary between about 0 to about 0.5 moles of hydrogen per mole of ethylene in the gas phase. Any gas inert to the catalyst and reactants can also be present in the gas stream.

Thus the process of the invention is for the polymerization of ethylene or the copolymerization of ethylene with an alpha olefin of 3 to 10 carbon atoms, at temperatures ranging from 50 to 115 degrees C., in a fluid bed gas phase process conducted at less than 1000 psi, produces resin having a MI (g/10 min.) value in the range of 0.0001 to 500, (wherein MI is measured according to ASTM D-1238 Condition E), and the process comprises (a) fluidizing a particulate, activated supported metallocene catalyst, in a fluid bed gas phase reactor, wherein the catalyst comprises a support which is silica, alumina or silica/alumina wherein the catalyst comprises said support, a transition metal and aluminum, wherein the amount of transition metal (elemental basis) ranges from 0.001 to 10 weight percent and the amount aluminum (elemental basis) ranges from 1 to 40 weight percent.

wherein the Al:(transition metal) ratio (elemental basis) ranges from 25 to 10000;

(b) contacting said catalyst with a feed selected from the group consisting of (1) ethylene, (2) ethylene admixed with hydrogen, (3) ethylene admixed with an alpha olefin of 3 to 10 carbon atoms, and (4) ethylene admixed with hydrogen and an alpha olefin of 3 to 10 carbon atoms;

(c) maintaining a polymerization pressure of less than about 1000 psi, at a temperature which is in a range of from about 55 degrees C. as a lower limit and a maximum limit of about 115 degrees C.;

(d) maintaining a polymerization temperature which is effective to control the molecular weight, expressed as MI, wherein MI decreases as the polymerization temperature is increased from said lower limit to said upper limit, and wherein MI increases as the polymerization temperature is decreased from said upper limit to said lower limit, (e) recovering polymerization product having a settled bulk density in the range of about 22 to about 36 lb/ft3 and a specific density of less than about 0.94 g/cc.

In one embodiment of the invention, the process comprises (c) maintaining a polymerization pressure of less than about 1000 psi, at a temperature which is in a range of from about 55 degrees C. as a lower limit and a maximum limit of about 115 degrees C.; and (d) maintaining a polymerization temperature which exceeds about 65 degrees C to produce a polymerization product having MI of less than 4; and (e) recovering polymerization product with MI of less than 4, having a settled bulk density in the range of about 22 to about 36 lb/ft3 and a specific density of less than about 0.94 g/cc.

In another embodiment of the invention, the process comprises (c) maintaining a polymerization pressure of less than about 1000 psi, at a temperature which is in a range of from about 50 degrees C. as a lower limit and a maximum limit of about 110 degrees C.; (d) maintaining a polymerization temperature which is less than about 100 degrees C. to produce a polymerization product having MI of greater than about 0.5, (e) recovering polymerization product with MI of greater than about 1, having a settled bulk density in the range of about 22 to about 36 lb/ft3 and a specific density of less than about 0.94 g/cc.

The Fluid Bed Reactor

A fluidized bed reaction system can be used in the practice of the process of the present invention. Such a system comprises a reactor which consists of a reaction zone, a velocity reduction zone and a distributor plate. Although fouling can occur in all of the cold areas (areas in a reactor at a temperature which is less than the temperature at which any component(s), in the gas phase reactor are liquid rather than gaseous) distributor plate fouling is the one most easily detected, since it results in a rapid increase in the pressure drop across the distributor plate due to flow restriction. Such flow restrictions also result in changing fluidization patterns and contribute to reactor operating problems. The lowest temperature in the reactor loop is in the reactor inlet beneath the distributor plate. Other areas representing the coldest sections in the fluid bed reactor system include the cooler and piping between the cooler and the bottom head.

The reaction zone comprises a bed of growing polymer particles and a minor amount of catalyst particles fluidized by the continuous flow of polymerizable and modifying gaseous components. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", *Chemical Engineering Progress Symposium Series*, Vol. 62, p. 100–111 (1966). The distribution plate serves the purpose of supporting the bed and distributing recycle gas through the bed at a rate sufficient to maintain fluidization of the bed. Fluidization is achieved by a high rate of gas recycle to and through the bed, typically in the order of 50 to 200 times the rate of feed of make-up gas. Make-up gas is fed to the bed at a rate equal to the rate at which particulate polymer product is formed by reaction plus any vent or other losses. The composition of the make-up gas is determined by a gas analyzer usually piped across the compressor. The composition of the make-up gas is continuously adjusted to maintain an essentially steady state gaseous composition within the reaction zone.

The portion of the gas stream which does not react in the bed (the recycle gas) passes a velocity reduction zone where entrained particles are given an opportunity to drop back into the bed, and is compressed in a compressor, passes through a heat exchanger and is returned to the bed. The distribution plate serves the purpose of diffusing recycle gas through the bed at a rate sufficient to maintain fluidization. The plate may be a screen, slotted plate, perforated plate, a plate of the bubble cap type, and the like. The elements of the plate may all be stationary, or the plate may be of the mobile type disclosed in U.S. Pat. No. 3,298,792.

Under a given set of operating conditions, the fluidized bed is maintained at essentially a constant height by withdrawing a portion of the bed as product at a rate equal to the rate of formation of the particulate polymer product. The catalyst is injected into the bed at a point above the distribution plate at a rate equal to its consumption. Injection of the catalyst is via a catalyst feeder. Since the catalysts used in the practice of this invention are highly active, injection of the fully activated catalyst into the area below the distribution plate may cause polymerization to begin there and eventually cause plugging of the distribution plate. Injection into the bed, instead, aids in distributing the catalyst throughout the bed and precludes the formation of localized spots of high catalyst concentration.

The Preferred Catalyst Compositions

The preferred catalysts used in the invention comprise a carrier, an alumoxane and at least one metallocene. The catalyst is free-flowing and particulate in form comprising dry powder particles having a particle size of from about 1 micron to about 250 microns, preferably from about 10 microns to about 150 microns. The catalysts which contain only one transition metal in the form of a metallocene have an activity of at least about 200 kg polymer/g of transition metals. The aluminoxane and metallocene loading on the carrier is such that the amount of aluminum, (elemental basis) provided by the aluminoxane, on the carrier ranges from 1 to 40 weight percent, preferably from 5 to 30 weight percent, and most preferably from 5 to 15 weight percent. The optimum MAO loading is in the range of 3 to 15 mmoles of aluminum per gram of silica carrier; if a silica carrier is overloaded with MAO, the catalyst activity is lower and the catalyst particles agglomerate with attendant problems of transferring the catalyst.

The amount of metallocene on the carrier ranges, on a transition metal elemental basis, from 0.001 to 10 weight percent, preferably from 0.01 to 1.0, and most preferably from 0.05 to 0.4 weight percent. Accordingly the ratio of Al:Zr (on an elemental basis) in the catalyst can range from 25 to 10,000, usually within the range of from 50 to 1000 but preferably from about 75 to 500, or from about 70 to 350 and most preferably from 100 to 200.

To form catalysts of the invention, all catalyst components can be dissolved with alumoxane and impregnated into the carrier. Catalyst preparation is undertaken under anhydrous conditions and in the absence of oxygen. In a unique process, the carrier material is impregnated with alumoxane, preferably methylalumoxane, in a process described below. The class of alumoxanes comprises oligomeric linear and/or cyclic alkylalumoxanes represented by the formula:

R—(Al(R)—O)$_n$—AlR$_2$ for oligomeric, linear alumoxanes and (—Al(R)—O—)$_m$ for oligomeric cyclic alumoxane wherein n is 1–40, preferably 10–20, m is 3–40, preferably 3–20 and R is a $C_1$–$C_8$ alkyl group and preferably methyl. MAO is a mixture of oligomers with a very wide distribution of molecular weights and usually with an average molecular weight of about 1200. MAO is typically kept in solution in toluene.

The volume of the solution comprising an alumoxane and a solvent therefor can vary, depending on the catalyst sought to be produced. In a preferred embodiment of alumoxane incorporation into the carrier, one of the controlling factors in the alumoxane incorporation into the carrier material catalyst synthesis is the pore volume of the silica. In this preferred embodiment, the process of impregnating the carrier material is by infusion of the alumoxane solution, without forming a slurry of the carrier material, such as silica, in the alumoxane solution. This is undertaken with agitation. The volume of the solution of the alumoxane is sufficient or less than that required to fill the pores of the carrier material without forming a slurry in which the volume of the solution exceeds the pore volume of the silica; accordingly and preferably, the maximum volume of the alumoxane solution is, does not exceed, the total pore volume of the carrier material sample. That maximum volume of the alumoxane solution insures that no slurry of silica in solvent is formed in this step. By way of example, if the pore volume of the carrier material is 1.65 cc/gm, then the volume of alumoxane will be equal to or less than 1.65 cc/gm of carrier material. Thus, the maximum volume of solution (of metallocene and alumoxane) will equal the total pore volume of the carrier, e.g. silica, which is the pore volume in, e.g., cc/gm, times the total weight of the carrier used. As a result of this provision, the impregnated carrier material will appear dry immediately following impregnation although the pores of the carrier may be filled with inter alia solvent. The preferred solvent for the aluminoxane, e.g. methylalumoxane, is toluene. The advantage is that the impregnation is undertaken in a single solvent system.

Solvent may be removed from the alumoxane impregnated pores of the carrier material by heating and/or under a vacuum or purged with heating in an inert gas, such as nitrogen. If elevated temperature is employed, the temperature conditions in this step are controlled to reduce, if not to eliminate, agglomeration of impregnated carrier particles and/or crosslinking of the alumoxane. In this step, solvent can be removed by evaporation effected at relatively low elevated temperatures of above about 40° and below about 60° to obviate agglomeration of catalyst particles and crosslinking of the alumoxane. Preferably drying is undertaken at 45 degrees C or less for 5 to 7 hours. Although solvent can be removed by evaporation at relatively higher temperatures than that defined by the range above 40° and below about 60° C., very short heating times schedules must be employed to obviate agglomeration of catalyst particles and crosslinking of the alumoxane, with reduction of catalyst activity. Accordingly, an active catalyst has been produced at evaporation temperature of 110° C in less than 10 seconds (at extremely short heating times), whereas at 45° C., drying can be undertaken for periods of 24 hours. A vacuum can be employed to facilitate drying.

In a preferred embodiment, the metallocene is added to the solution of the alumoxane prior to impregnating the carrier with the solution. Again the maximum volume of the alumoxane solution also containing the metallocene is the total pore volume of the carrier material sample. The mole ratio of aluminum provided by aluminoxane, expressed as A1, to metallocene metal expressed as M (e.g. Zr), ranges from 50 to 1000, preferably 75 to 500, and most preferably 100 to 200. An added advantage of the present invention is that this Al:(transition metal, e.g. Zr) ratio can be directly controlled. In a preferred embodiment the alumoxane and metallocene compound are mixed together at ambient temperature for 0.1 to 6.0 hours, prior to use in the infusion step. The solvent for the metallocene and alumoxane can be appropriate solvents, such as aromatic hydrocarbons, halogenated aromatic hydrocarbons, ethers, cyclic ethers or esters; preferably it is toluene.

The metallocene compound has the formula $Cp_mMA_nB_p$ in which Cp is an unsubstituted or substituted cyclopentadienyl group, M is zirconium or hafnium and A and B belong to the group including a halogen atom, hydrogen or an alkyl group. In the above formula of the metallocene compound, the preferred transition metal atom M is zirconium. In the above formula of the metallocene compound, the Cp group is a mono- or a polysubstituted cyclopentadienyl group. The substituents on the cyclopentadienyl group can be preferably straight-or branched chain $C_1$–$C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when m in the above formula of the metallocene compound is equal to 2, the cyclopentadienyl groups can be also bridged by polymethylene or dialkylsilane groups, such as —$CH_2$—, —$CH_2$—$CH_2$—, —CR'R"—and —CR'R"—CR'R"— where R' and R" are short alkyl groups or hydrogen, —$Si(CH_3)_2$—, $Si(CH_3)_2$—$CH_2$—$CH_2$—$Si(CH_3)_2$— and similar bridge groups. If the A and B substituents in the above formula of the metallocene compound are halogen atoms, they belong to the group of fluorine, chlorine, bromine or iodine. If the substituents A and B in the above formula of the metallocene compound are alkyl groups, they are preferably straight-chain or branched $C_1$—$C_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1$–$C_6$ alkyls. Illustrative, but non-limiting examples of metallocenes include bis(n-butylcyclopentadienyl)zirconium dichloride, bis(n-butylcyclopentadienyl)hafnium dichloride, bis(n-butylcyclopentadienyl)zirconium dimethyl, bis(n-butylcyclopentadienyl)hafnium dimethyl, bis(n-butylcyclopentadienyl)zirconium hydridochloride, bis(n-butylcyclopentadienyl)hafnium hydridochloride, bis(iso-butylcyclopentadienyl)zirconium dichloride, bis(pentamethylcyclopentadienyl)zirconium dichloride, bis(pentamethylcyclopentadienyl)hafnium dichloride, bis(iso-butylcyclopentadienyl)zirconium dichloride, cyclopentadienylzirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl)]zirconium dichloride. The metallocene compounds utilized within the embodiment of this art can be used as crystalline solids, as solutions in aromatic hydrocarbons or in a supported form.

The carrier material is a solid, particulate, porous, preferably inorganic material, such as an oxide of silicon and/or of aluminum. In the most preferred embodiment, the carrier is silica in the form of spherical particles, e.g., as obtained by a spray-drying process. The carrier material is used in the form of a dry powder having an particle size of from about 1 micron to about 500 microns, preferably from about 1 micron to about 250 microns, and most preferably about 10 microns to about 150 microns particle size. If necessary, the final catalyst containing carrier material may be sieved to insure elimination of large catalyst particles. Presently, elimination of catalyst particles that have a particle size of greater than 500 microns is envisaged; preferably, elimination of particles of greater than 250 micron particle size, and, most preferably, elimination of particles of greater than 150 micron particle size is undertaken. Sieving of the material is preferably undertaken after impregnation of the carrier with the metallocene and the aluminoxane. This is highly desirable in the embodiment of the invention, in which the catalyst contains only one transition metal in the form of a metallocene and which is used to form narrow molecular weight LLDPE, to reduce and/or to eliminate gels in the final polyolefin product and to eliminate reactor hot spots, thereby to insure reactor continuity, particularly in the gas phase fluid bed process.

The surface area of the carrier is at least about 3 square meters per gram ($m^2$/gm), preferably, 5 to 1200 square meters per gram ($m^2$/gm) and most preferably at least about 50 $m^2$/gm up to about 350 $m^2$/gm. The pore volume of the carrier will range from 0.1 to 5 $cm^3$/gm, preferably from 0.1 to 3.5 $cm^3$/gm. The carrier material should be dry, that is, free of absorbed water.

The silica may contain 0 to 2.5 mmoles of hydroxyl group(s) per gram of silica. Preferably, the carrier is silica, which contains [OH]groups. The hydroxyl group of the silica will range from greater than 0.5 to 2.5 mmoles/gram silica. This range is favored by lower drying, dehydration and/or calcination temperatures.

The silica hydroxyl (herein silanol, silica hydroxy(1) is used interchangeably) groups are detectable by IR spectroscopy. Quantitative determinations of the hydroxyl concentration on silica are made by contacting a silica sample with methyl magnesium iodide and measuring methane evolution (by pressure determination).

Dehydration of silica material can be effected by heating at about 100° C. to about 600° C., preferably from about 150° C to about 300° C. and most preferably at about 250° C.

Silica dehydrated at 600° C. (for about 16 hours) will have a surface hydroxyl concentration of about 0.7 mmoles per gram (mmols/gm) of silica. Silica dehydrated at 800° C. will be a silica with 0.5 mmole of silica hydroxy per gram silica. The silica of the most preferred embodiment is a high surface area, amorphous silica (surface area =300 $m_2$/gm; pore volume of 1.65–3.0 $cm_3$/gm), and it is a material marketed under the tradenames of PQ 988, Davison 952 or Davison 955 by the Davison Chemical Division of W. R. Grace and Company. As purchased, the silicas are not dehydrated and must be dehydrated prior to use.

The effect of silica hydroxyl groups on the catalyst activity and productivity is discussed below. The synthesis of the catalyst of the invention exhibiting highest activity dictates that the silica contain hydroxyl groups for contact with the solution containing alumoxane and metallocene, described below. It was determined that reaction of the hydroxyl groups of the silica with scavengers, such as trialkylaluminum compounds, e.g., trimethylaluminum (TMA), reduced the activity of the catalyst produced thereby compared to a catalyst formed with a silica having hydroxyl groups unreacted with such a scavenger. Silicas containing higher hydroxyl numbers produce catalysts of higher activity than silicas of lower hydroxyl numbers; in copending application Ser. No. 08/141,912, filed Oct. 22, 1993 now abandon it was shown that treating the silica with trimethylaluminum to react with the silanol or silica hydroxy groups [which, with appropriate molar amount of TMA the hydroxyl concentration is reduced to 0 (zero), as indicated by IR] prior to catalyst synthesis produced a catalyst with a productivity of about 200 kg(polymer)/g transition metal. However, this activity is good activity, and the catalyst exhibiting such activity is useful in the processes herein. By comparison, catalysts with a hydroxyl group content of 1.8 mmole/gram silica exhibits a productivity of more than 1000 kg(polymer)/g transition metal. The amount of hydroxyl groups, in mmoles/gram silica can be affected by the dehydration temperatures used to condition the silica. Specifically, the dehydration temperatures of about 600 degrees C reduce the amount of reactive hydroxyl groups available for contact with the solution of aluminoxane and metallocene. By comparison, the dehydration temperatures of about 250 degrees C increase the amount of reactive hydroxyl groups available for contact with the solution of aluminoxane and metallocene, relative to the silica heat treated, for dehydration purposes to 600 degrees C. Thus it has been found that the catalyst made with the silica subjected to dehydration temperatures of 250 degrees C is more active than a catalyst produced with the silica subjected to drying temperatures of 600 degrees C. Accordingly, preferred dehydration and/or calcination temperatures are below 300 degrees C and preferably at about 250 degrees C. Accordingly, the silica used in embodiments of the invention will contain a silanol (OH) concentration of greater than 0.7 mmoles OH per gram silica; preferably it will contain greater than 0.7 mmoles up to 2.5 mmoles OH per gram of silica. In preferred embodiments, the concentration ranges from 1.6 to 2.0 mmoles/gram silica.

The polymerization and copolymerization products

Both low density (0.88 to 0.939 g./cc) and high density (0.94 to 0.965 and above) products with high bulk density, low (hexane) extractables and granular morphology can be prepared in the slurry or gas phase reactor with no fouling. The resin produced has a high molecular weight, narrow molecular weight distribution, and homogeneous branching distribution. The catalyst ash contains small amounts of Zr and Al , e.g., less than 1 ppm Zr and 100 ppm Al. The high activity of the catalysts of the invention which also exhibit long catalyst life and produce high bulk density products are significant factors in the unexpected efficacy of these catalysts in catalytic polymerizations and copolymerizations of olefins.

Ethylene polymers, as well as copolymers of ethylene with one or more $C_3$–$C_{10}$ alpha-olefins, can be produced in accordance with the invention. Thus, copolymers having two monomeric units are possible as well as terpolymers having three monomeric units. Particular examples of such polymers include ethylene/1-butene copolymers, ethylene/1-hexene copolymers and ethylene/4-methyl-1-pentene copolymers.

Ethylene/1-butene and ethylene/1-hexene copolymers are the most preferred copolymers polymerized in the process of and with the catalyst of this invention. The ethylene copolymers produced in accordance with the present invention preferably contain at least about 80 percent by weight of ethylene units.

In one embodiment, the catalyst of the invention exhibits high activity for polymerization of ethylene and higher alpha-olefins and allows the synthesis of ethylene polymers and copolymers with a relatively narrow molecular weight distribution and homogeneous branching distribution. The molecular weight distribution is determined as MFR (melt flow ratio of $I_{21}/I_2$) which ranges from 15 to 25, in polymerizations of the invention. Branching distribution in ethylene copolymers is evaluated on the basis of the resin's melting point. Relatively homogeneous branching distribution is one which the melting point ranges from 100° to 120° C., depending on comonomer composition. In this embodiment, the catalyst of the invention contains only one source of transition metal, a metallocene.

More particularly, the copolymer products contain 0.1 to 2 ppm of Zr. The product has an average particle size of 0.015–0.035 inches, settled bulk density from 22 to 36 lb/ft3. The narrow molecular weight distribution low density copolymers have been produced with MI from one to 500 and less than 1, down to 0.0001. The low density products of the invention exhibit a MI which can range from 0.0001 to 500, preferably from 0.1 to 200, and most preferably 0.5 to 5.0. The low density products of the invention exhibit a melt flow ratio (MFR) of 15 to 25 preferably from 14 to 20; products with MFR ranging from 16 to 18 have been made; MFR is the ratio I 21/I2 [wherein I 21 is measured at 190 degrees C] in accordance with ASTM D-1238, Condition F, and I 2 is measured in accordance with ASTM D-1238, Condition E]. When fabricated into films, the films of the copolymers exhibit balanced tear strength, as measured by ASTM D-1922. Furthermore the LLDPE of the invention exhibits Dart Drop Impact values as measured by ASTM D-1709 of greater than 800. The products of the catalysis with the catalyst of the invention are substantially free of gels. The films exhibit very low haze values as measured by ASTM D-1003, preferably in the range of 3 to 10, more preferably from 5 to 7. The catalyst ash contains less than 1 ppm Zr and 40 ppm Al. Because of the excellent comonomer incorporation of the catalyst and the branching homogeneity of the resin, significant amount of hexene saving can be achieved.

MAO (methylalumoxane) is commercially available from Ethyl Chemical and WITCO (previously Schering Berlin) as 10 weight percent and 30 weight percent solutions, which were the sources of MAO used in the Examples.

EXAMPLES

Catalyst Preparation
1. Catalyst Preparation Using silica Reacted with TMA

PQ 988 IM silica was dehydrated at 600° C. for 4 hours. 486 grams of this dehydrated silica were reacted with 517 cc of trimethylaluminum (14.8 wt. % Al) and dried to a white powder at 80° C.

6.90 gram of bis(n-butylcyclopentadienyl) zirconium dichloride, 470 ml of toluene, and 649.7 gram of methylalumoxane (14.1 wt. % Al in toluene) were mixed together until the Zr complex dissolved. This catalyst solution was then added slowly into the silica previously treated with trimethylaluminum. The contents were agitated vigorously to make sure the reagent solution was well-dispersed among the silica support.

The mixture was dried at 45° C. for 6 hours until a free flowing powder was obtained. The catalyst was not sieved.

2. Catalyst Preparation using Silica without TMA Treatment (a) Catalyst 1: Davison 955 silica was dehydrated at 600° C. for 4 hours. 500 g of this dehydrated silica were then reacted with a solution of 7.084 g of (n-butylCp)$_2$ZrCl$_2$ dissolved in 677.6 g of MAO (14.1 wt % Al) in toluene. The Al/Zr molar ratio was 200:1. The catalyst was dried under flowing N$_2$ at 45° C. for 6 hours, and was sieved to remove any particles larger than 150 microns.

(b) Catalyst 2: Catalyst 2 was prepared in similar manner to Catalyst 1 (see (a) above) except that the drying time was 5 hours.

(c) Catalyst 3, 4, 5, 6 and 7: These catalysts were prepared in similar manner to Catalyst 2 (see (b) above).

(d) Catalyst 8: This catalyst was prepared in similar manner to Catalyst 2 (see (b) above), except that Davison 955 silica was dehydrated at 250° C.

Gas phase pilot plant reactor results

These catalysts were used in the pilot plant fluid bed reactor (13 Inch internal diameter, 4 ft$^3$ reaction zone) to evaluate their operability and responses to different process variables. Good reactor operability was achieved after a few adjustments were made to the reactor operating parameters. The catalysts used in this work can be divided into two types based upon the difference in activity. Catalyst of Example 1 fits into the low activity group while all the others fit into the higher activity group. All the catalysts in the high activity group should be considered the same for the below discussion.

The resins produced have good settled bulk density (25 to 36 lb/ft$^3$) and the fines (defined as finer than 120 Mesh) were less than 5%. Table 1 shows the data. The following examples illustrate the uniqueness of the process responses.

1. Tests 1 and 2 indicate that the Melt Index of the product decreases with increasing temperature. This is contrary to olefin polymerization literature that we know of.

2. Tests 3 and 4 reconfirm the effect of temperature with a different catalyst formulation which is about three times more active (about one third ash, Al and Zr).

3. Tests 5 and 6 indicate that the MI increases as a result of increasing the hexene gas ratio as expected. However, further increase in hexene gas ratio to make low density (test 7) actually decreased melt index, which is unexpected. The difference in ethylene partial pressure between tests 7 and 6 does not explain the MI change. Ethylene partial drop from 206 psi to about 125 psi is required to increase MI from 4.1 (test 7) to 7.1 (test 6).

4. Tests 7 and 8 indicate that MI drops significantly with injection of isopentane into the reactor. We do not know of any previous literature that cited this effect of isopentane. This finding is very significant because this gives an effective way of reducing MI to about 1 MI without increasing temperature which can be detrimental to good reactor operation for low density products.

5. Oxygen reduces MI (compare tests 9 and 10 with 7). Also, addition of oxygen in combination with isopentane (test 12) can give fractional MI resin. This result is not expected particularly because the catalyst contains aluminum alkyl. Any oxygen addition was expected to be scavenged by the aluminum alkyl before modifying the catalyst site. We are not aware of any technology where oxygen reduces MI. It is well known in chromium catalyst technology, in which aluminum alkyls are not required to activate catalyst, oxygen increases MI; not decrease MI. This finding is critical to make 1 MI and fractional MI resins without increasing reactor temperature.

6. Water is found to increase MI (compare tests 7 and 11). This result is not expected since the catalyst contains aluminum alkyl. Any water addition was expected to be scavenged by the aluminum alkyl before modifying the catalyst site.

In addition to isopentane, oxygen and water, we explored other additives such as TIBA, carbon dioxide, carbon monoxide and acetylene. The results indicated TIBA increases MI, CO2 and CO decrease MI while acetylene does not have a significant effect. However, all these modifiers do not have the same impact on the catalyst activity in achieving similar changes in MI. Table 2 gives these results. The following examples explain the results further.

1. Tests 1 and 2 show TIBA increases MI significantly. In addition, the activity of the catalyst increased significantly in the presence of TIBA (compare the Zirconium ppm in the product). Preliminary tests using other electron withdrawing compounds such as TMA and TEAL indicate all of these compounds may not effect the MI similarly on this catalyst.

2. Tests 3 and 4 compared with 2 show that carbon dioxide reduces the MI with this catalyst which is not expected from the effect of carbon dioxide on other catalysts. Similarly, tests 5 and 6 compared with 2 show carbon monoxide also reduces the melt index. However, the catalyst activity drops significantly more with carbon monoxide compared to the effect of carbon dioxode (compare 4 and 6).

3. Unlike the results reported in Table 1, where we could make 1 MI using isopentane alone (test 8, Table 1), addition of a modifier was necessary along with isopentane while doing tests reported in Table 2. We believe this is due to difference in the background level of modifiers.

4. We believe any electron donating compound e.g. CO, CO$_2$ or an electron withdrawing compound, e.g., TIBA can modify our metallocene catalysts to change the resin MI. Other electron donating compounds can be ethers, alcohol, peroxides, ketones, esters, thioethers, carbonyls, amines, phosphines, phenols, etc. Other electron withdrawing compounds can be trialkylaluminum, alkyl aluminum chloride, trialkyl borane, etc. We believe these modifiers can also work in gas phase, slurry or high pressure process.

PRODUCT SCOPING

Using these catalysts, we have done preliminary product scoping in the fluid bed reactor. As a result of the unique combinations of isopentane, hexene, temperature and modifiers that we discovered in this work, we were able to adjust MI and densities in a very broad range; ranging from 0.904 to 0.962 g/cc by varying comonomer level (hexene or butene) and melt index ranging from 0.5 to 250 by varying the reactor temperature, ethylene partial pressure, isopentane, oxygen (or carbon dioxide, carbon monoxide) and hydrogen. We believe we can produce significantly lower or higher melt index (less than 0.2 or greater than 500) materials if necessary. Similarly, we expect we can make lower density than 0.904 g/cc and densities higher than 0.962 if necessary.

TABLE 1

Reactor Conditions

| Test | Catalyst | Temp (oC) | IC5 (psi) | Modifier | Modifier (ppm) | $C_6C_2$ mole ratio | Ethylene Partial (psi) | Ash (ppm) | Alum (ppm) | Zirc. (ppm) | Melt Index (g/10 Min) | Density (g/cc) |
|---|---|---|---|---|---|---|---|---|---|---|---|---|
| 1 | 1 | 65 | 0 | none | 0 | 0.0088 | 261 | 777 | 111 | 1.95 | 4.1 | 0.931 |
| 2 | 1 | 85 | 0 | none | 0 | 0.0087 | 243 | 746 | 105 | 1.75 | 2.3 | 0.93 |
| 3 | 2.1 | 85 | 0 | none | 0 | 0.0089 | 222 | 266 | 32 | 0.6 | 2.5 | 0.931 |
| 4 | 2.1 | 75 | 0 | none | 0 | 0.0098 | 218 | 275 | — | 0.47 | 4.4 | 0.931 |
| 5 | 2.2 | 77.5 | 0 | none | 0 | 0.003 | 180 | 276 | 30 | 0.44 | 2.6 | 0.943 |
| 6 | 2.2 | 77.5 | 0 | none | 0 | 0.01 | 178 | 250 | 26.2 | 0.5 | 7.1 | 0.929 |
| 7 | 2.5 | 77.5 | 0 | none | 0 | 0.021 | 206 | 237 | 37.6 | 0.3 | 4.1 | 0.918 |
| 8 | 2.3 | 77.5 | 44 | none | 0 | 0.016 | 185 | 331 | 44 | 0.46 | 1 | 0.918 |
| 9 | 2.4 | 77.5 | 0 | oxygen | 0.4 | 0.016 | 180 | 423 | 52 | 1.1 | 2.4 | 0.919 |
| 10 | 2.4 | 77.5 | 0 | oxygen | 1 | 0.016 | 188 | 606 | 68.4 | 1.3 | 1.7 | 0.919 |
| 11 | 2.6 | 77.5 | 0 | water | 4 | 0.016 | 188 | 280 | 22 | 0.5 | 6.1 | 0.922 |
| 12 | 2.7 | 77.5 | 52 | oxygen | 0.3 | 0.018 | 195 | 446 | 65 | 1 | 0.6 | 0.919 |

TABLE 2

Reactor Conditions

| Test | Catalyst | Temp (oC) | IC5 (psi) | Modifier | Modifier (ppm) | $C_6C_2$ mole ratio | Ethylene Partial (psi) | Ash (ppm) | Alum (ppm) | Zirc. (ppm) | Melt Index (g/10 Min) | Density (g/cc) |
|---|---|---|---|---|---|---|---|---|---|---|---|---|
| 1 | 2.8 | 77.5 | 52 | TIBA* | 345 | 0.02 | 182 | 129 | 33.8 | 0.3 | 3.7 | 0.9208 |
| 2 | 2.8 | 77.5 | 47 | none | 0 | 0.017 | 192 | 155 | 20 | 0.46 | 1.7 | 0.921 |
| 3 | 2.8 | 77.5 | 47 | $CO_2$ | 0.5 | 0.107 | 184 | 209 | 21 | 0.44 | 1.5 | 0.918 |
| 4 | 2.8 | 77.5 | 47 | $CO_2$ | 1.14 | 0.018 | 176 | 186 | 32 | 0.7 | 1.1 | 0.919 |
| 5 | 2.8 | 77.5 | 47 | CO | 1 | 0.019 | 189 | 386 | 57 | 1.3 | 0.8 | 0.9175 |
| 6 | 2.8 | 77.5 | 43 | CO | 0.65 | 0.019 | 185 | 325 | 42 | 0.83 | 1.2 | 0.917 |
| 7 | 2.8 | 77.5 | 48 | $C_2H_2$ | 1.12 | 0.017 | 182 | 203 | 21.7 | 0.5 | 1.5 | 0.9185 |

*Aluminum alkyl Tri-isobutyl Aluminum

What is claimed is:

1. A process for the polymerization of ethylene or the copolymerization of ethylene with an alpha olefin of 3 to 10 carbon atoms, at temperatures ranging from 50 to 115 degrees C., in a fluid bed gas phase process conducted at less than 1000 psi, produces resin having a MI (g/10 min.) value in the range of 0.0001 to 500, (wherein MI is measured according to ASTM D-1238 Condition E), wherein the process comprises (a) fluidizing a particulate, activated supported metallocene catalyst, in a fluid bed gas phase reactor, wherein the catalyst comprises a support which is silica, alumina or silica/alumina wherein the catalyst comprises said support, a transition metal and aluminum, wherein the amount of transition metal (elemental basis) ranges from 0.001 to 10 weight percent and the amount aluminum (elemental basis) ranges from 1 to 40 weight percent wherein the Al:(transition metal) ratio (elemental basis) ranges from 25 to 10000;

(b) contacting said catalyst with a feed selected from the group consisting of (1) ethylene, (2) ethylene admixed with hydrogen, (3) ethylene admixed with an alpha olefin of 3 to 10 carbon atoms, and (4) ethylene admixed with hydrogen and an alpha olefin of 3 to 10 carbon atoms;

(c) maintaining a polymerization pressure of less than 1000 psi, at a temperature which is in a range of from 55 degrees C. as a lower limit and a maximum limit of 115 degrees C.;

(d) maintaining a polymerization temperature which is effective to control the molecular weight, expressed as MI, wherein MI decreases as the polymerization temperature is increased from said lower limit to said upper limit, and wherein MI increases as the polymerization temperature is decreased from said upper limit to said lower limit, (e) recovering polymerization product having a settled bulk density in the range of 22 to about 36 lb/ft3 and a specific density of less than about 0.94 g/cc.

2. The process of claim 1, wherein the catalyst is in the form of particles, wherein said particles have a particle size in the range of 1 to 500 microns wherein said particles comprise silica, a transition metal and aluminum, wherein the ratio of aluminum to transition metal ranges from about 70 to 350;

wherein said silica is amorphous and porous and has a pore volume of 0.1 to 5 cc/gm; wherein said silica has a concentration of silanol groups wherein the concentration of silanol groups is in the range of 0 to 2.5 mmole per gram of silica;

wherein said silica is contacted with a volume of a mixture comprising a metallocene and an alumoxane, wherein said volume of said mixture is no greater than the total pore volume of said silica which is dehydrated silica, wherein said metallocene has a formula, $Cp_m MA_n B_p$, wherein Cp is a substituted cyclopentadienyl group;
m is 1 or 2;
M is zirconium or hafnium; and
each of A and B is selected from the group consisting of a halogen atom, a hydrogen atom, an alkoxyl group and an alkyl group, providing that m+n+p is equal to the valence of the metal M;

wherein said alumoxane has a formula (a) or (b) wherein (a) is $R-(Al(R)-O)_n-AlR_2$ for oligomeric, linear alumoxanes and (b) is $(-Al(R)-O-)_m$ for oligomeric cyclic alumoxane wherein n is 1–40, m is 3–40, and R comprises a $C_1-C_8$ alkyl group;

wherein said contacted silica is an activated catalyst.

3. The process of claim 2, wherein the metallocene is selected from the group consisting of bis(n-butylcyclopentadienyl)metal dihalides, bis(n-butylcyclopentadienyl)metal hydridohalides, bis(n-butylcyclopentadienyl)metal monoalkyl monohalides, bis(n-butylcyclopentadienyl)metal dialkyls and bis(indenyl)metal dihalides.

4. The process of claim 2, wherein the metallocene is bis(isobutylcyclopentadienyl) zirconium dichloride.

5. The process of claim 1, wherein said range of MI is 0.05 to 6.

6. The process of claim 1, wherein the polymerization pressure is less than about 400 psi.

7. A process for the polymerization of ethylene or the copolymerization of ethylene with an alpha olefin of 3 to 10 carbon atoms, at temperatures ranging from 60° to 115° C., in a fluid bed gas phase process conducted at less than 1000 psi, produces resin having a MI (g/10 min.) value in the range of 0.0001 to 500, (wherein MI is measured according to ASTM D-1238 Condition E), wherein the process comprises (a) fluidizing a particulate, activated supported metallocene catalyst, in a fluid bed gas phase reactor, wherein the catalyst comprises a porous, amorphous support which is silica, alumina or silica/alumina
wherein the catalyst comprises said support, a transition metal and aluminum, wherein the amount of transition metal (elemental basis) ranges from 0.001 to 10 weight percent and the amount aluminum (elemental basis) ranges from 1 to 40 weight percent wherein the Al:(transition metal) ratio (elemental basis) ranges from 25 to 10000;

(b) contacting said catalyst with a feed selected from the group consisting of (1) ethylene, (2) ethylene admixed with hydrogen, (3) ethylene admixed with an alpha olefin of 3 to 10 carbon atoms, and (4) ethylene admixed with hydrogen and an alpha olefin of 3 to 10 carbon atoms;

(c) maintaining a polymerization pressure of less than 1000 psi, at a temperature which is in a range of from 55° C. as a lower limit and a maximum limit of 115° C.; and (d) maintaining a polymerization temperature which exceeds 55° C. to produce a polymerization product having MI of less than 4; wherein the MI decreases as the polymerization temperature is increased to said maximum temperature; and (e) recovering polymerization product with MI of less than 4, having a settled bulk density in the range of 22 to 36 lb/ft3 and a specific density of less than 0.94 cc/g.

8. The process of claim 7, wherein the temperature exceeds 70 degrees C.

9. The process of claim 7, wherein the temperature exceeds 75 degrees C.

10. The process of claim 7, which includes decreasing said product MI of less than 4 to a lower value which ranges from about 3 to about 0.05 by increasing the polymerization temperature within the range of 55 to 100 degrees C.

11. The process of claim 7, wherein said process comprises maintaining said polymerization pressure at less than about 400 psi.

12. The process of claim 11, wherein the MI decreases as the polymerization temperature increases.

13. A process for the polymerization of ethylene or the copolymerization of ethylene with an alpha olefin of 3 to 10 carbon atoms, at temperatures ranging from 60° to 115° C., in a fluid bed gas phase process conducted at less than 1000 psi, produces resin having a MI (g/10 min.) value in the range of 0.0001 to 500, (wherein MI is measured according to ASTM D-1238 Condition E), wherein the process comprises (a) fluidizing a particulate, activated supported metallocene catalyst, in a fluid bed gas phase reactor, wherein the catalyst comprises a porous, amorphous support which is silica, alumina or silica/alumina
wherein the catalyst comprises said support, a transition metal and aluminum, wherein the amount of transition metal (elemental basis) ranges from 0.001 to 10 weight percent and the amount aluminum (elemental basis) ranges from 1 to 40 weight percent wherein the Al:(transition metal) ratio (elemental basis) ranges from 25 to 10000; wherein the catalyst is in the form of particles, wherein said particles have a particle size in the range of 1 to 500 microns
wherein said transition metal is provided as a metallocene which has a formula, $Cp_m MA_n B_p$, wherein Cp is a substituted cyclopentadienyl group;
m is 1 or 2;
M is zirconium or hafnium; and each of A and B is selected from the group consisting of a halogen atom, a hydrogen atom, an alkoxyl group and an alkyl group, providing that m+n+p is equal to the valence of the metal M;

wherein said aluminum is provided as an alumoxane which has a formula (a) or (b) wherein (a) is $R-(Al(R)-O)_n-AlR_2$ for oligomeric, linear alumoxanes and (b) is $(-Al(R)-O-)_m$ for oligomeric cyclic alumoxane wherein n is 1–40, m is 3–40, and R comprises a $C_1-C_8$ alkyl group;

(b) contacting said catalyst with a feed selected from the group consisting of (1) ethylene, (2) ethylene admixed with hydrogen, (3) ethylene admixed with an alpha olefin of 3 to 10 carbon atoms, and (4) ethylene admixed with hydrogen and an alpha olefin of 3 to 10 carbon atoms;

(c) maintaining a polymerization pressure of less than about 400 psi, at a temperature which is in a range of from 55° C. as a lower limit and a maximum limit of 115° C.; and (d) maintaining a polymerization temperature which exceeds 55° C. to produce a polymerization product having MI of less than 500 wherein the MI decreases as the polymerization temperature is increased from said lower limit to said maximum Limit; and (e) recovering polymerization product with MI of less than 500, having a settled bulk density in the range of 22 to 36 lb/ft3 and a specific density of less than 0.94 g/cc.

14. The process of claim 13, wherein said particles comprise silica, a transition metal and aluminum, wherein the ratio of aluminum to transition metal ranges from about 70 to 350;

wherein said silica is amorphous and porous and has a pore volume of 0.1 to 5 cc/gm; wherein said silica has a concentration of hydroxyl groups wherein the concentration of hydroxyl groups is in the range of 0 to 2.5 mmole per gram of silica;

wherein said silica is contacted with a volume of a solution comprising an alumoxane activated metallocene, wherein said volume of said solution is no greater than the total pore volume of said silica.

15. The process of claim 13, wherein the MI decreases as the polymerization temperature is increased to said maximum temperature.

16. A process for the polymerization of ethylene or the copolymerization of ethylene with an alpha olefin of 3 to 10 carbon atoms, at temperatures ranging from 60° to 115° C., in a fluid bed gas phase process conducted at less than 1000 psi, produces resin having a MI (g/10 min.) value in the range of 0.0001 to 500, (wherein MI is measured according to ASTM D-1238 Condition E), wherein the process comprises (a) fluidizing a particulate, supported activated metallocene catalyst composition, in a fluid bed gas phase reactor, wherein the catalyst composition comprises a porous, amorphous support which is silica, alumina or silica/alumina wherein the catalyst composition comprises said support, a transition metal and aluminum, wherein the amount of transition metal (elemental basis) ranges from 0.001 to 10 weight percent and the amount aluminum (elemental basis) ranges from 1 to 40 weight percent wherein the Al:(transition metal) ratio (elemental basis) ranges from 25 to 10000;

wherein the catalyst is in the form of particles, wherein said particles have a particle size in the range of 1 to 500 microns wherein said transition metal is provided as a metallocene which has a formula, $Cp_mMA_nB_p$, wherein Cp is a substituted cyclopentadienyl group;

m is 1 or 2;

M is zirconium or hafnium; and each of A and B is selected from the group consisting of a halogen atom, a hydrogen atom, an alkoxyl group and an alkyl group, providing that m+n+p is equal to the valence of the metal M;

wherein the metallocene is selected from the group consisting of bis(n-butylcyclopentadienyl)metal dihalides, bis(isobutylcyclopentadienyl) zirconium dichloride, bis(n-butylcyclopentadienyl)metal hydridohalides, bis(n-butylcyclopentadienyl)metal monoalkyl monohalides, bis(n-butylcyclopentadienyl)metal dialkyls and bis(indenyl)metal dihalides;

wherein said aluminum is provided as an alumoxane which has a formula (a) or (b) wherein (a) is $R-(Al(R)-O)_n-AlR_2$ for oligomeric, linear alumoxanes and (b) is $(-Al(R)-O-)_m$ for oligomeric cyclic alumoxane wherein n is 1–40, m is 3–40, and R comprises a $C_1-C_8$ alkyl group;

(b) contacting said catalyst with a feed selected from the group consisting of (1) ethylene, (2) ethylene admixed with hydrogen, (3) ethylene admixed with an alpha olefin of 3 to 10 carbon atoms, and (4) ethylene admixed with hydrogen and an alpha olefin of 3 to 10 carbon atoms;

(c) maintaining a polymerization pressure of less than 1000 psi, at a temperature which is in a range of from 55° C. as a lower limit and a maximum limit of 115° C.; and (d) maintaining a polymerization temperature which exceeds 55° C. to produce a polymerization product having MI of less than 5; wherein the MI decreases as the polymerization temperature is increased from said lower limit to said maximum limit; and (e) recovering polymerization product with MI of less than 5, having a settled bulk density in the range of 22 to 36 lb/ft3 and a specific density of less than 0.94 g/cc.

17. The process of claim 16, wherein the temperature exceeds 70 degrees C.

18. The process of claim 16, wherein the temperature exceeds 75 degrees C.

19. The process of claim 16, wherein the metallocene is bis(isobutylcyclopentadienyl) zirconium dichloride.

20. The process of claim 16, wherein the MI decreases as the polymerization temperature increases.

21. The process of claim 16, wherein said particles comprise silica, a transition metal and aluminum, wherein the ratio of aluminum to transition metal ranges from about 70 to 350;

wherein said silica is amorphous and porous and has a pore volume of 0.1 to 5 cc/gm; wherein said silica has a concentration of hydroxyl groups wherein the concentration of hydroxyl groups is in the range of 0 to 2.5 mmole per gram of silica;

wherein said silica is contacted with a volume of a solution comprising an alumoxane activated metallocene, wherein said volume of said solution is no greater than the total pore volume of said silica.

22. A process for the polymerization of ethylene or the copolymerization of ethylene with an alpha olefin of 3 to 10 carbon atoms, at temperatures ranging from 60° to 115° C., in a fluid bed gas phase process conducted at less than 10000 psi, produces resin having a MI (g/10 min.) value in the range of 0.05 to 10, (wherein MI is measured according to ASTM D-1238 Condition E), wherein the process comprises (a) fluidizing a particulate, activated supported metallocene catalyst, in a fluid bed gas phase reactor, wherein the catalyst comprises a support which is silica, alumina or silica/alumina wherein the catalyst comprises said support, a transition metal and aluminum, wherein the amount of transition metal (elemental basis) ranges from 0.001 to 10 weight percent and the amount aluminum (elemental basis) ranges from 1 to 40 weight percent wherein the Al:Zr ratio (elemental basis) ranges from 25 to 10000;

wherein the catalyst is in the form of particles, wherein said particles have a particle size in the range of 1 to 500 microns wherein said transition metal is provided as a metallocene which has a formula, $Cp_mMA_nB_p$, wherein Cp is a substituted cyclopentadienyl group;
m is 1 or 2;
M is zirconium or hafnium; and
each of A and B is selected from the group consisting of a halogen atom, a hydrogen atom, an alkoxyl group and an alkyl group, providing that m+n+p is equal to the valence of the metal M;

wherein the metallocene is selected from the group consisting of bis(n-butylcyclopentadienyl)metal dihalides, bis(isobutylcyclopentadienyl) zirconium dichloride bis(n-butylcyclopentadienyl)metal hydridohalides, bis(n-butylcyclopentadienyl)metal monoalkyl monohalides, bis(n-butylcyclopentadienyl)metal dialkyls and bis(indenyl)metal dihalides;

wherein said aluminum is provided as an alumoxane which has a formula (a) or (b) wherein (a) is R—(Al(R)—O)$_n$—AlR$_2$ for oligomeric, linear alumoxanes and (b) is (—Al(R)—O—)$_m$ for oligomeric cyclic alumoxane wherein n is 1–40, m is 3–40, and R comprises a $C_1$–$C_8$ alkyl group;

(b) contacting said catalyst with a feed selected from the group consisting of (1) ethylene, (2) ethylene admixed with hydrogen, (3) ethylene admixed with an alpha olefin of 3 to 10 carbon atoms, and (4) ethylene admixed with hydrogen and an alpha olefin of 3 to 10 carbon atoms;

(c) maintaining a polymerization pressure of less than about 1000 psi, at a temperature which is in a range of from about 50° C. as a lower limit and a maximum limit of about 115° C.;

(d) maintaining a polymerization temperature which is less than about 100° C. to produce a polymerization product having MI of greater than about 0.5 wherein the MI increases as the polymerization temperature is decreased from said maximum limit, (e) recovering polymerization product with MI of greater than about 0.5, having a settled bulk density in the range of about 22 to about 36 lb/ft3 and a specific density of less than about 0.94 g/cc.

23. The process of claim 22, wherein the MI is greater than about 1.

24. The process of claim 23, wherein the MI is greater than about 2.

25. The process of claim 24, wherein the temperature is less than about 90 degrees C.

26. The process of claim 25, wherein the temperature is less than about 85 degrees C.

27. The process of claim 23, wherein the temperature is less than about 80 degrees C.

28. The process of claim 24, wherein the temperature is less than about 80 degrees C.

29. The process of claim 22, wherein the metallocene is bis(isobutylcyclopentadienyl) zirconium dichloride.

30. The process of claim 22, wherein said particles comprise silica, a transition metal and aluminum, wherein the ratio of aluminum to transition metal ranges from about 70 to 350;

wherein said silica is amorphous and porous and has a pore volume of 0.1 to 5 cc/gm; wherein said silica has a concentration of hydroxyl groups wherein the concentration of hydroxyl groups is in the range of 0 to 2.5 mmole per gram of silica;

wherein said silica is contacted with a volume of a solution comprising an alumoxane activated metallocene, wherein said volume of said solution is no greater than the total pore volume of said silica.

* * * * *